Dec. 25, 1928.
J. W. FAY
1,696,268
APPARATUS FOR PRODUCING SOLDERING UNITS
COMPRISING SOLDER AND FLUXING MATERIAL
Filed Sept. 10, 1924

Inventor
Joseph W. Fay
by H. A. Patterson
Att'y.

Patented Dec. 25, 1928.

1,696,268

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

APPARATUS FOR PRODUCING SOLDERING UNITS COMPRISING SOLDER AND FLUXING MATERIAL.

Application filed September 10, 1924. Serial No. 736,844.

This invention relates to apparatus for producing soldering units comprising solder and fluxing material.

The primary object of the invention is to produce a soldering unit of an easily dispensable form and containing predetermined amounts of solder and fluxing material sufficient for a soldering operation.

According to the features of the invention, the soldering units are formed from flux cored solder which is advanced intermittently into a position between two rollers having cooperating edges adapted to sever predetermined lengths from the flux cored solder. The rollers contemporaneously impart a spherical form to each of the predetermined lengths, the solder of each length being worked in such manner that it becomes a shell enclosing the fluxing material of the length.

Other objects and features of the invention will become apparent as the detailed description progresses, reference being had to the accompanying drawings, wherein—

Figure 1:
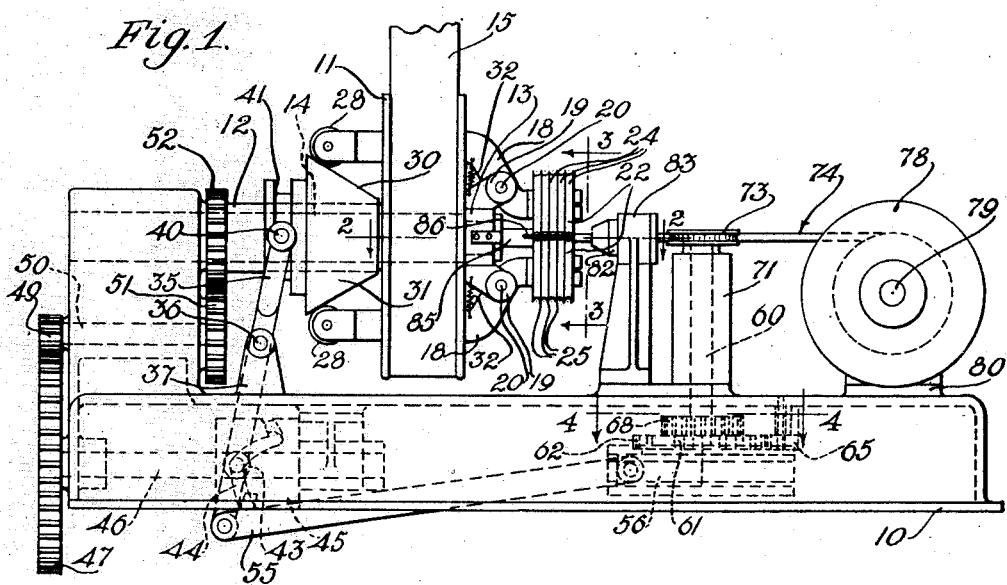
Figure 2:
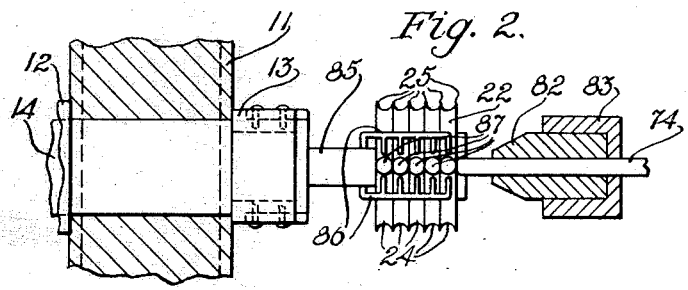
Figure 3:
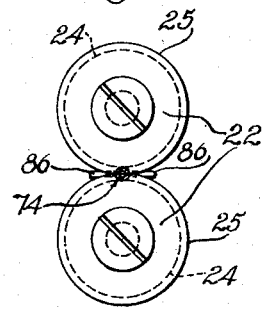
Figure 4:
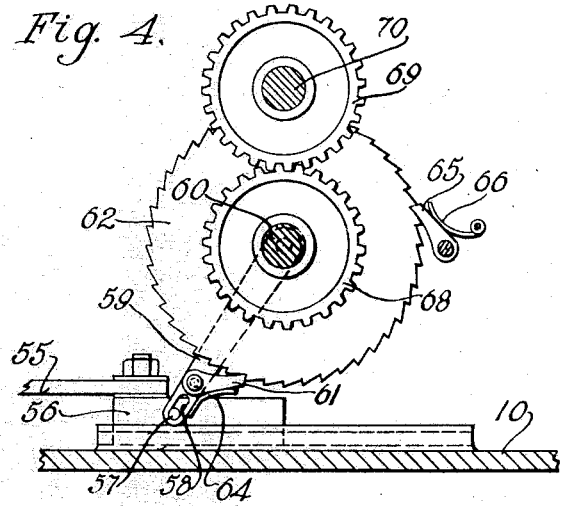
Figure 5:
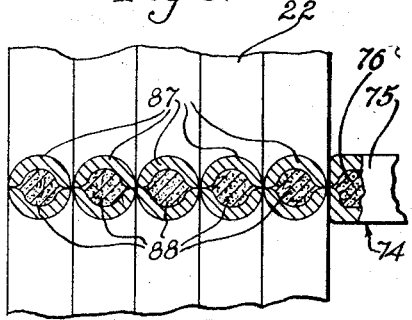

Fig. 1 is a side elevation of apparatus embodying the invention;

Figs. 2, 3, and 4 are sections taken on lines 2—2, 3—3, and 4—4, respectively, of Fig. 1, and Fig. 5 is a diagrammatic view illustrating the manner in which the improved apparatus forms pellets of solder and the fluxing material from flux cored solder.

It is believed that a complete understanding of the improved apparatus will be had from the following description.

Referring for the present to Fig. 1, the reference character 10 designates a base upon which the improved apparatus is mounted. The improved apparatus comprises a pulley 11 having elongated hub members 12 and 13 whereby the pulley is rotatably journaled upon a stud shaft 14 rigidly secured in the frame 10. The pulley 11 is driven from any suitable means (not shown) through the medium of a belt 15 trained around the pulley.

Constrained to rotate with the pulley 11 are a pair of levers 18 which are pivotally mounted intermediate their ends in bifurcated lugs 19 formed integral with the hub member 13, a plurality of pins 20 being provided for thus mounting the levers in the bifurcated lugs. Each lever 18 is provided with a roller 22 which is rotatably journaled upon one end of the lever and aligned with the corresponding roller upon the other lever 18. Each roller 22 is provided with a plurality of annular grooves 24 which form a plurality of annular sharp edges 25. The sharp edges 25 of one roller 22 are adapted to engage with the sharp edges of the second roller 22 for a purpose which will presently appear. Each lever 18 is provided with an anti-friction roller 28 adapted to ride upon a frustro-conical surface 30 formed upon a collar 31 which is splined upon the hub member 12. The anti-friction rollers 28 are yieldingly held in contact with the frustro-conical surface 30 by a plurality of helical springs 32, each of which has one of its ends secured to one of the bifurcated lugs 19. It will be readily understood that the collar 31 may be brought into a position wherein it permits the anti-friction rollers 28 to approach each other under the action of the springs 32. The levers 18 will then assume positions wherein the rollers 22 are spaced from each other.

A lever 35 adapted to displace the collar 31 along the hub 12 is pivotally mounted intermediate its ends upon a pin 36 projecting from a bracket 37 formed integral with the base 10. The upper arm of the lever 35 is bifurcated and carries a plurality of anti-friction rollers 40 which ride in an annular groove 41 turned in the collar 31. The lower arm of the lever 35 is provided with an anti-friction roller 43 adapted to ride in a cam track 44 cut in a cam 45 which is rigidly secured to a shaft 46 rotatably journaled in the base 10. A gear 47 fastened to one end of the shaft 46 meshes with a pinion 49 secured to one end of a shaft 50 rotatably journaled in the base 10. A gear 51 fastened to the other end of the shaft 50 meshes with a gear 52 formed integral with the hub member 12. It is obvious that the cam 45 will rotate in synchronism with the pulley 11. The cam track 44 is so designed that it will oscillate the lever 35 to bring the collar 31 alternately out of and into the position wherein it is shown in Fig. 1.

Pivotally secured to the lower end of the lever 35 is a link 55 which connects the lever with a slide 56 mounted in the base 10. A pin 57 projecting from the slide 56 engages a slot 58 formed in the free end of a lever 59 pivoted upon the lower end of a vertically disposed shaft 60. A pawl 61 carried by the lever 59 is adapted to engage a ratchet 62 rigidly secured to the shaft 60, the pawl 61 being yieldingly held in engagement with the ratchet 62 by a leaf spring 64 carried by the lever 59. The ratchet is provided with a holding pawl 65 normally held in engagement with the ratchet by a leaf spring 66. A gear 68 secured to the shaft 60 meshes with a similar gear 69 secured to a vertically disposed shaft 70. The vertically disposed shafts 60 and 70 are rotatably journaled in a plurality of posts 71 mounted upon the base 10. Rigidly secured to the upper end of each of the vertically disposed shafts 60 and 70 is one of a pair of grooved rollers 73 which are adapted to feed flux cored solder to the rollers 22, the flux cored solder being indicated at 74. The flux cored solder 74 preferably comprises a cylindrical tube 75 of solder enclosing a core of suitable fluxing material 76. The rollers 73 are, of course, intermittently rotated when the machine is in operation, this motion being imparted to the rollers by the cam 45 through the medium of the lever 35, the link 55, the pawl 61, the ratchet 62 and the gears 68 and 69. The grooved rollers 73 are adapted to withdraw the flux cored solder 74 from a supply reel 78 rotatably journaled upon a pin 79 projecting from a bracket 80 mounted upon the base 10. The flux cored solder is advanced by the grooved rollers 73 through a tubular guide 82 seated in a bracket 83 mounted upon the base 10. The apparatus is so designed that with each revolution of the cam 45 a length of the flux cored solder 74 will be advanced to a position wherein it may be engaged by the rollers 22 when the rollers are brought into the positions wherein they are shown in Fig. 1. The sharp edges of the rollers 22 then cooperate to sever predetermined lengths from the flux cored solder 74 which predetermined lengths are contemporaneously formed into pellets comprising predetermined amounts of solder and fluxing material. The distance which the flux cored solder is advanced during each feeding operation is gauged by a stop member 85 rigidly secured to the hub 13. Referring to Figs. 2 and 3, it will be noted that the stop member 85 is provided with a plurality of fingers 86 adapted to retain the predetermined lengths of cored solder between the rollers 22 when the rollers are in the positions wherein they are shown in Fig. 1.

In the operation of the apparatus, a supply reel 78 holding a continuous strand of flux cored solder 74 is first properly positioned upon the pin 79 and the free end of continuous strand is threaded between the grooved rollers 73 and through the guide 82. The apparatus is then set in operation and the belt 15 continues to drive it until the belt is disconnected from the source of power. At the beginning of each cycle of operations, the rollers 22 are spaced from each other. The flux cored solder 74 is advanced against the gauge or stop 85 by means of the rollers 73 which are driven intermittently through the ratchet 62. As soon as the flux cored solder has been properly positioned against the stop 85 and between the fingers 86, the rollers 22 are brought to the positions indicated in Fig. 1 to sever predetermined lengths from the flux cored solder 74 and to form the predetermined lengths into pellets comprising substantially spherical shells 87 of solder, which shells enclose cores 88 of fluxing material. The rollers 22 are withdrawn from operative engagement with each other at the end of each cycle of operations so that the pellets may drop into any suitable receptacle (not shown).

It is, of course, understood that the rollers 22 are rotated bodily around the axis of rotation of the pulley 11 and that each roller 22 is free to rotate around its own axis. This construction permits the apparatus to roll the cylindrical pieces of flux cored solder 74 into pellets and to draw the solder into a shell having a rounded outer surface.

Solder in the form of pellets having cores of fluxing material may be dispensed in predetermined quantities by apparatus of comparatively simple construction as shown in my copending applications, Serial No. 731,177, filed August 9, 1924, and Serial No. 731,178, filed August 9, 1924. The pellets may be made of any desired size so that a series of similar soldering operations may be performed using equal amounts of solder in each instance.

What is claimed is:

1. In apparatus for forming soldering units, a plurality of rollers having cooperating peripheral edges adapted to sever a predetermined length from a tube of solder containing fluxing material, and means for revolving said rollers around a common axis.

2. In apparatus for forming soldering units, means comprising a plurality of cooperating rollers for separating a predetermined quantity of solder from a supply thereof, and for imparting a substantially spherical form to the quantity of solder, and means for revolving the rollers around a common axis to effect the spherical formation of the solder.

3. In an apparatus for forming cored solder units, forming rollers having cooperating edges, means for intermittently feeding solder having a core of fluxing material into a predetermined position with respect to the rollers, means cooperating with the intermittent feeding means to move the rollers into contact with a portion of the solder positioned by the feeding means, and means for revolving the rollers about the solder to form a spherical pellet of solder having a core of fluxing material sealed within a shell of solder.

In witness whereof, I hereunto subscribe my name this 2 day of September A. D., 1924.

JOSEPH WILLIAM FAY.